(12) United States Patent
Szuszczewicz et al.

(10) Patent No.: US 7,711,384 B1
(45) Date of Patent: May 4, 2010

(54) METHOD AND COMPUTER-READABLE MEDIUM FOR IN-CALL STATUS FOR DISPATCH GROUP CALLS

(75) Inventors: Karalyn M. Szuszczewicz, Haymarket, VA (US); Trinh D. Vu, Ashburn, VA (US); Jeffrey Scott Posner, Bethesda, MD (US)

(73) Assignee: Nextel Communications Inc., Reston, VA (US)

( * ) Notice: Subject to any disclaimer, the term of this patent is extended or adjusted under 35 U.S.C. 154(b) by 483 days.

(21) Appl. No.: 11/449,845

(22) Filed: Jun. 9, 2006

Related U.S. Application Data

(60) Provisional application No. 60/689,080, filed on Jun. 10, 2005.

(51) Int. Cl.
*H04M 1/00* (2006.01)
*H04M 3/42* (2006.01)
*H04B 1/38* (2006.01)

(52) U.S. Cl. ............. 455/519; 455/518; 455/90.2; 455/416; 379/202.01

(58) Field of Classification Search ............. 455/517, 455/518, 519, 566, 407, 416, 90.2; 379/202.01
See application file for complete search history.

(56) References Cited

U.S. PATENT DOCUMENTS

| | | | |
|---|---|---|---|
| 6,385,461 B1 * | 5/2002 | Raith | 455/518 |
| 2002/0037754 A1 * | 3/2002 | Hama et al. | 455/566 |
| 2005/0149876 A1 * | 7/2005 | Kortum et al. | 715/753 |
| 2005/0176454 A1 * | 8/2005 | Chakraborty et al. | 455/518 |
| 2008/0307040 A1 * | 12/2008 | So | 709/203 |

\* cited by examiner

*Primary Examiner*—George Eng
*Assistant Examiner*—Un C Cho

(57) ABSTRACT

A method and computer-readable medium for displaying group call status information and participant status information for a group call are provided. Users participating in a dispatch group session (call) are provided with details about the group itself (group status) and the users participating in the group (participant status). When changes are made to the group call, the group call status information and the participant status information may be updated and displayed in real time.

16 Claims, 3 Drawing Sheets

METHOD AND COMPUTER-READABLE MEDIUM FOR IN-CALL STATUS FOR DISPATCH GROUP CALLS

CROSS REFERENCE TO RELATED APPLICATIONS

The present application claims priority 35 U.S.C. §119 from U.S. Provisional Patent Application No. 60/689,080, which was filed on Jun. 10, 2005, the disclosure of which is incorporated herein by reference.

BACKGROUND OF THE INVENTION

Some wireless communication networks, such as the iDEN network owned and operated by Sprint Nextel Communications, Inc., can provide two different types of voice communications services, i.e., interconnect and dispatch. An interconnect communication is what is conventionally considered "cellular communications," while a dispatch communication is commonly known as a walkie-talkie or push-to-talk (PTT) type of call such as Nextel's service identified by the trade name Direct Connect.

Dispatch calls can be private calls or group calls. A dispatch private call is between two dispatch stations and a dispatch group call is between more than two dispatch stations. A talk group is a number of different communication stations which can be joined into a single communication session by dialing a single call identifier (i.e., a predetermined group call) or by selecting a group of invitees and dialing a dispatch call (i.e., an ad hoc group call). Existing systems and interfaces provide only a limited set of data regarding dispatch group calls that does not meet many customer demands. The present invention overcomes the limitations of this small set of data.

Qualcomm Incorporated provides a dispatch communication service known as QChat for use in 3G CDMA networks, for example. QChat uses standard voice-over Internet Protocol (VoIP) technologies, in which voice information is sent in a digital form in data packets over IP-based data networks. QChat allows end users to set up ad hoc group calls from a handset. To make an ad hoc group call, a user selects all of the invitees from a user interface on the handset and presses a dispatch call button to initiate the call.

One problem with the current QChat system for providing in-call status is that the user must request participant status information. Without such a request, participant status will not be provided to participants in a group call. Another problem in the current QChat system is that only the originator of the group call and the current talker on the group call are indicated to the other participants. Thus, there is no indication of who the other participants in the group call are. Also, the group and participant status information are not updated during the group call in the current QChat system.

SUMMARY OF THE INVENTION

The present invention solves the aforementioned problems of the related art. In accordance with the present invention, users participating in a dispatch group call are provided with details about the group itself (group status) and the users participating in the group (participant status), as well as real time updates of the group status and the participant status.

Other objects, advantages and novel features of the present invention will become apparent from the following detailed description of the invention when considered in conjunction with the accompanying drawings.

DETAILED DESCRIPTION OF THE EXEMPLARY EMBODIMENTS

One feature of dispatch communications is talk groups. A talk group is a number of different communication stations, which can be joined into a single communication session by actions performed at the initiating communication station. For predefined group calls, this action is dialing a single call identifier for the group, and for ad hoc group calls this action is the selection of a number of communication stations and depression of the dispatch call button. As used herein, the term communication stations includes both wired and wireless communication stations. Talk group communication sessions are highly desired by public safety agencies, because of the simplicity of setting up a communication session between, and communicating with, a number of communication stations.

Figure 1:
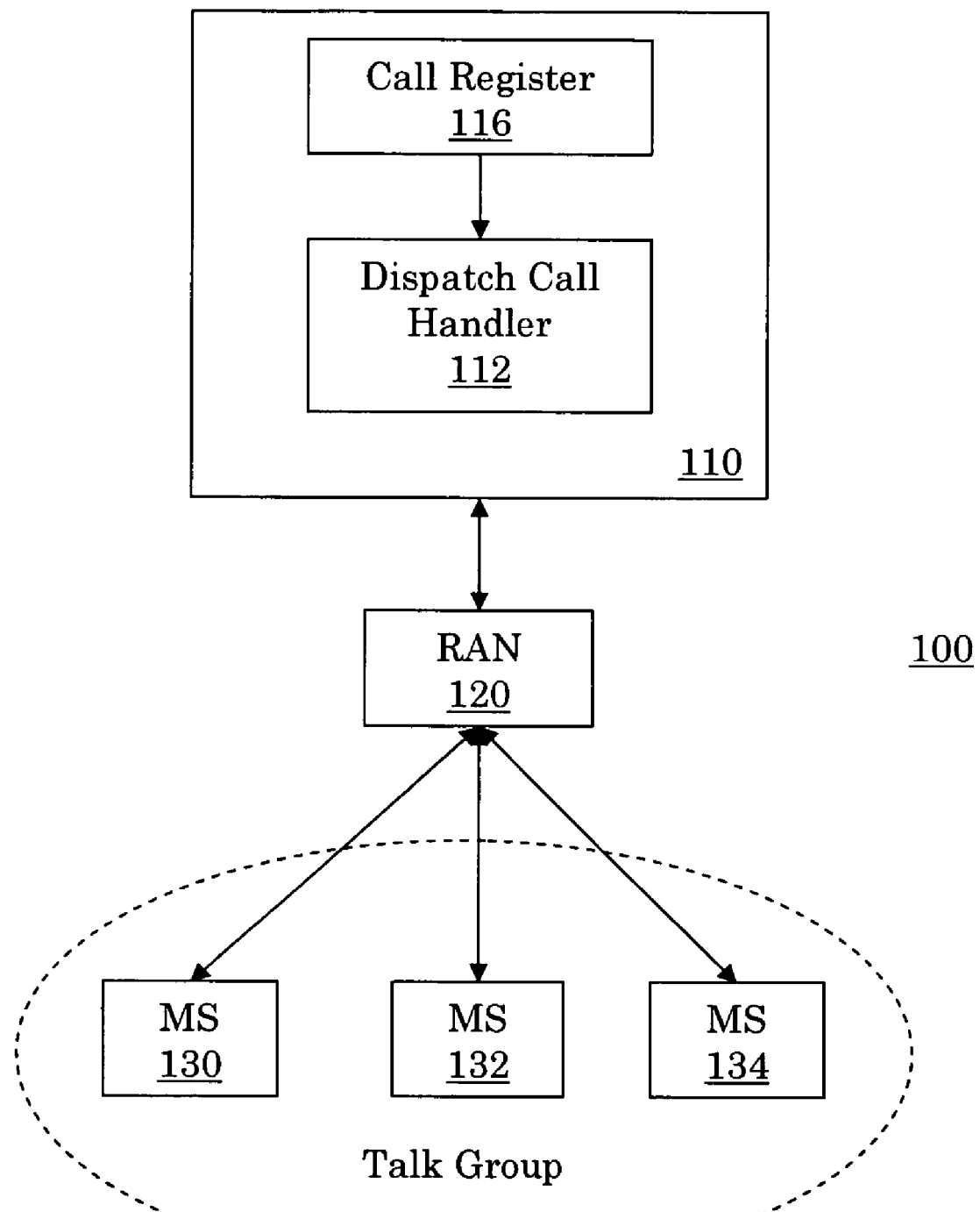
FIG. 1 illustrates an exemplary publicly-accessible communication network, which supports talk group dispatch communications, in accordance with one embodiment of the present invention.

FIG. 1 illustrates an exemplary publicly-accessible communication network 100, which supports talk group dispatch communications, in accordance with one embodiment of the present invention. The network 100 includes a dispatch area network subsystem 110, a radio access network (RAN) 120, and a number of communication stations (i.e., mobile stations (MS)) 130, 132, and 134. A dispatch area is a geographic area, which includes two or more cells that share network subsystems, such as mobile switching centers (MSCs) and location registers. The dispatch area network subsystem 110 includes a dispatch call handler 112 and a call register 116. The call register 116 generally operates in a similar manner to a location register and performs the functions of a home location register (HLR) to register and authenticate the user. Each dispatch call handler generally operates in a similar manner to a mobile switching center/visitor location register (MSC/VLR) or dispatch application processor (DAP).

In accordance with the present invention, any participant in an active dispatch group call will have the ability to view group call status information and participant status information at any time during the call. After the call is complete, participants in the dispatch group call can retrieve the same information. The group call status information and the participant status information may be provided by a server to mobile stations in a group call, such as a presence server or location register. In the QChat system, the server is referred to as the QChat server.

Figure 2:
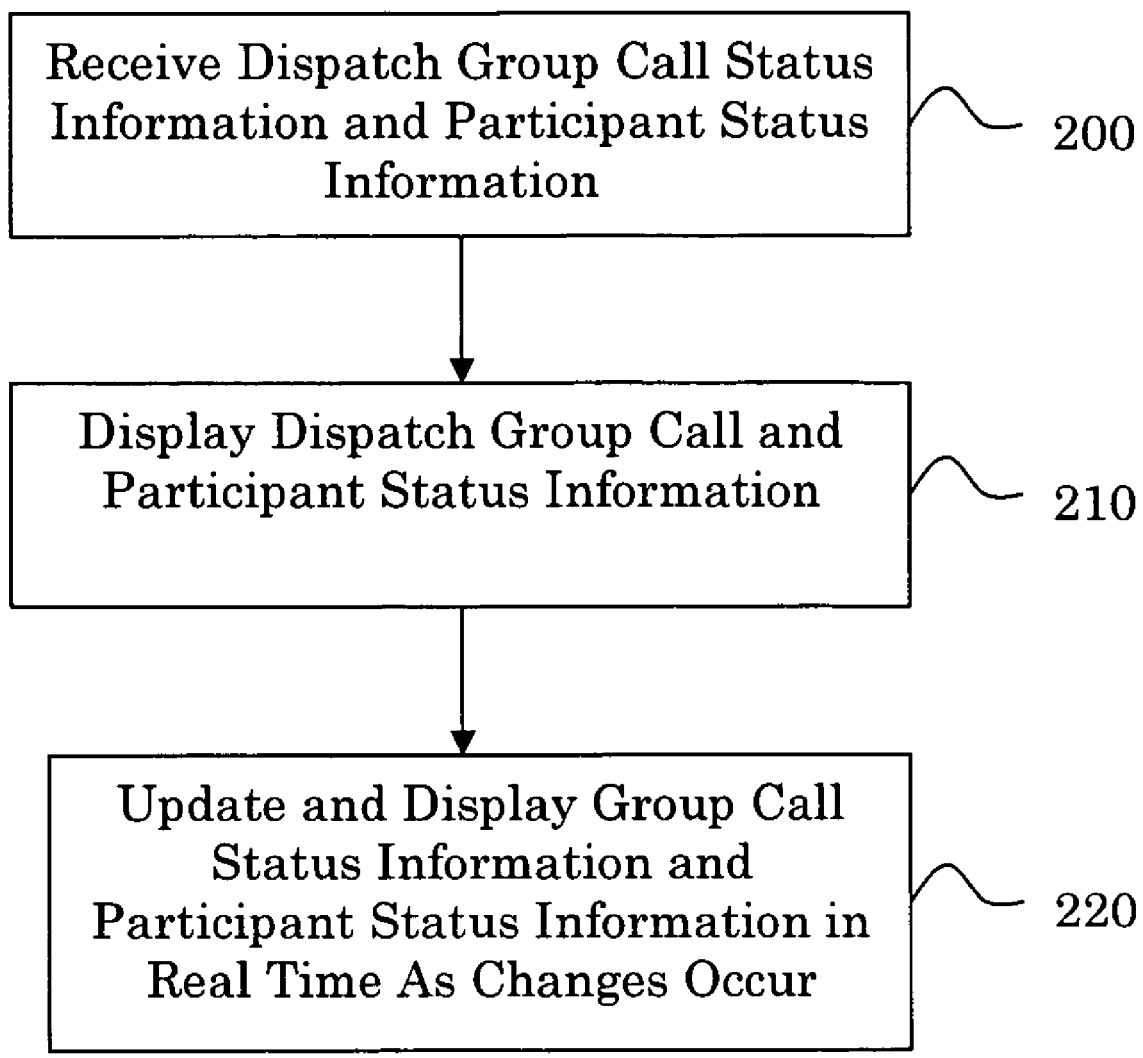
FIG. 2 illustrates a method for displaying group call status and participant status information, in accordance with the present invention.

FIG. 2 illustrates a method for displaying group call status and participant status information, in accordance with the present invention. In step 200 of FIG. 2, dispatch group call status information and participant status information are received. The group call status information may include a group indicator (e.g., the name of the group), group icon, number of invitees, number of active participants, and name and/or address of the initiator, i.e., the person initiating the group call. The initiator may also be referred to as the inviter. Participant status information may include a group call icon, a list of all invitees (e.g., names and/or addresses) to the call, name and/or address of the participant holding the floor (the current speaker) at the top of the list, icons by each invitee depicting his status, time(s) that a participant joined the call, and time(s) the participant exited the group call. If the participant exits and rejoins the same call, the enter and exit times of each session may be displayed. In step 210 of FIG. 2, the group call status and the participant status information are displayed.

In step 220 of FIG. 2, the group call status information and/or the participant status information may be updated in real time, when changes occur in the group call. The list of participants may have icons by each participant ID (e.g., number or name) of every invitee requested to join the group call, signifying the status of each invitee. The group list is dynamic, where the icons and list may change in real time as the participant status changes, for example, when the talker changes, when an invitee opts out, when a participant joins or rejoins, when a participant is added, etc. These changes are to be reflected in real time, even when a participant is scrolling through the participant list. A change to the participant list will not force the participant who is scrolling to begin at the top of the list.

When a participant is added to the call, when not in the original participant list, that participant and his status may also be added to the participant list and every participant in the call will be notified when a new participant is added to the call, who that participant is and who added that participant. In the case of regular changes to the initial group list, for example, when the talker changes, or a participant exits or rejoins, the change notification will be participant-configurable so that the participants can decide if and when they would like to receive notification of a change.

As mentioned above, there are a plurality of possible participant statuses. For example, the types of participant status depicted on the user interface (UI) with an icon may include "Talker" (the participant who is speaking), "Active" (the invitees who the page for the group call had reached), "Opted Out" (the invitees who opted out of the call), and "Unavailable" (the invitees who could not be reached, were powered down or out of network).

Figure 3:
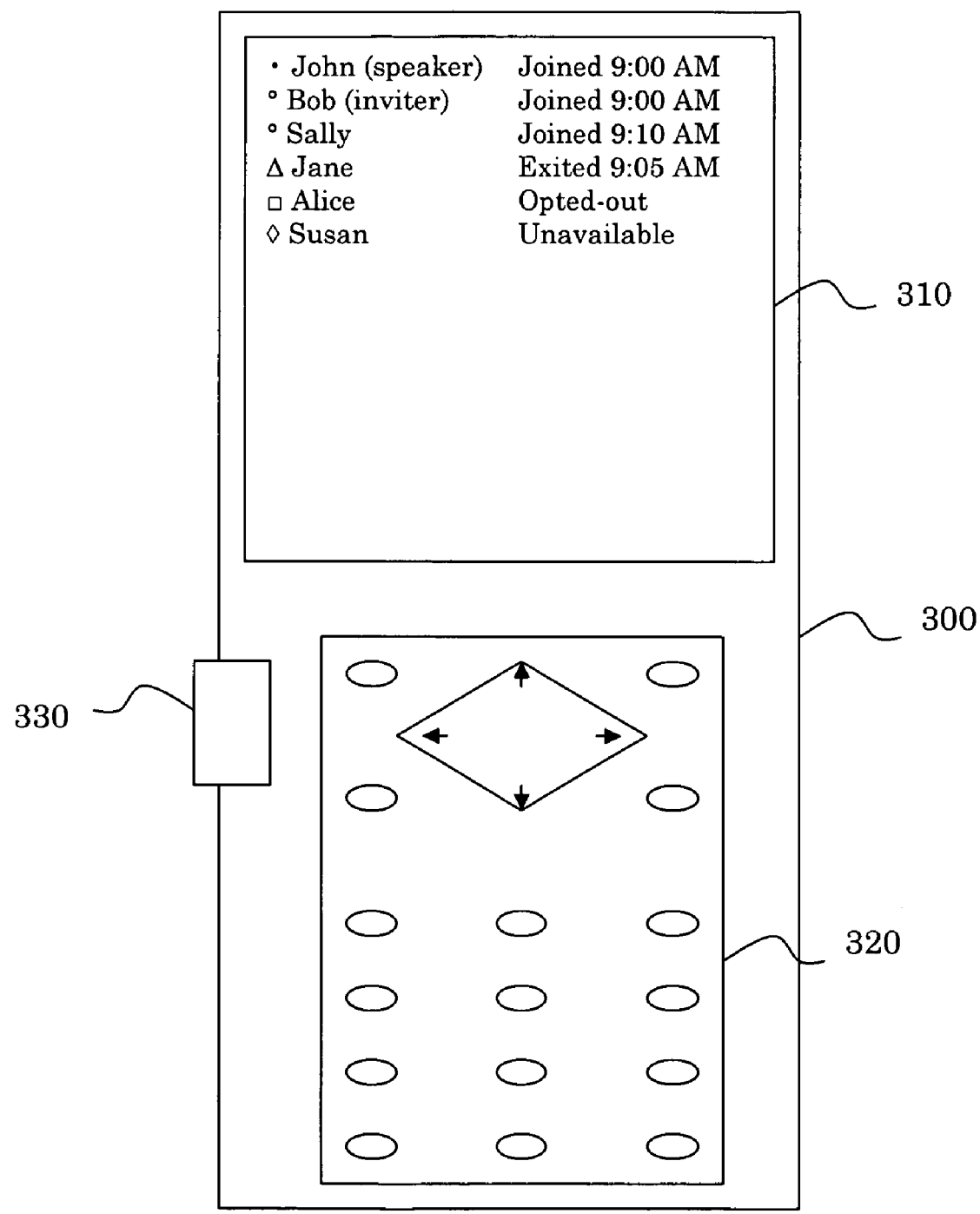
FIG. 3 illustrates an exemplary embodiment of a user interface in accordance with the present invention.

FIG. 3 illustrates an exemplary embodiment of a user interface in accordance with the present invention. When a dispatch group call is active, the group indicator, group icon, number of invitees, number of active participants and/or name and/or address of the participant who has the floor (i.e., the current speaker or "talker") can be displayed on a portion of a User Interface (UI), e.g., a screen. For example, the screen may be a display screen of a mobile station. As illustrated in FIG. 3, a user interface 300 may include a screen 310, a keyboard 320 with a plurality of buttons, and a dispatch call button 330. The dispatch call button 330 may be used to initiate the dispatch group call. The particular icons illustrated in FIG. 3 are merely exemplary, and other icons are within the scope of the invention.

In another exemplary embodiment of the present invention, there is a computer-readable medium encoded with a computer program for displaying information of a group call. The term "computer-readable medium" as used herein refers to any medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, or any other medium from which a computer can read.

An exemplary embodiment of a computer-readable medium encoded with a computer program for displaying information of a group call is illustrated in FIG. 2, which is described above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for displaying information of a dispatch group call, comprising the acts of:
  receiving, during the dispatch group call, group call status information and participant status information including a group call icon, a list of invitees including a participant ID for each of the invitees wherein the current speaker is disposed at the top of the list, a time at which each of the participants joined the group call, and a time at which each of the participants exited the group call; and
  displaying the group call status information and the participant status information on a screen,
  wherein, when a participant exits and rejoins the same group call, exit and rejoining times of each session on the group call are displayed;
  wherein, when a new participant is added to the group call, the screen displays an ID for the new participant and an indication of which participant added the new participant.

2. The method of claim 1, wherein, when a dispatch group call is active, an ID of the current speaker in the group call is displayed on the screen.

3. The method of claim 1, wherein the participant status information further includes an icon by each of the invitees depicting a status of each of the invitees.

4. The method of claim 3, wherein the status comprises one of talker, active, opted out, and unavailable.

5. The method of claim 1, further comprising the act of:
  notifying the participants when a new participant joins the group call.

6. The method of claim 1, further comprising the acts of:
  updating and displaying the group call status information and the participant status information in real time when changes occur in the group call.

7. The method of claim 1, wherein the ID of the initiator of the group call comprises a name and address of the initiator.

8. The method of claim 1, wherein the group call status information comprises a group ID, a group icon, a number of invitees to the group call or a number of active participants in the group call, and an ID of an initiator of the group call.

9. A computer-readable medium encoded with a computer program for displaying information of a dispatch group call, the computer program comprising instructions for:
  receiving, during the dispatch group call, group call status information and participant status information including a group call icon, a list of invitees including a participant ID for each of the invitees wherein the current speaker is disposed at the top of the list, a time at which each of the participants joined the group call, and a time at which each of the participants exited the group call; and displaying the group call status information and the participant status information on a screen, wherein, when a participant exits and rejoins the same group call, exit and rejoining times of each session on the group call are displayed;

wherein, when a new participant is added to the group call, the screen displays an ID for the new participant and an indication of which participant added the new participant.

10. The computer-readable medium of claim 9, wherein, when a dispatch group call is active, an ID of the current speaker in the group call is displayed on the screen.

11. The computer-readable medium of claim 9, wherein the participant status information further includes an icon by each of the invitees depicting a status of each of the invitees.

12. The computer-readable medium of claim 11, wherein the status comprises one of talker, active, opted out, and unavailable.

13. The computer-readable medium of claim 9, further comprising instructions for:

notifying the participants when a new participant joins the group call.

14. The computer-readable medium of claim 9, further comprising instructions for:

updating and displaying the group call status information and the participant status information in real time when changes occur in the group call.

15. The computer-readable medium of claim 9, wherein the ID of the initiator of the group call comprises a name and address of the initiator.

16. The computer-readable medium of claim 9, wherein the group call status information comprises a group ID, a group icon, a number of invitees to the group call or a number of active participants in the group call, and an ID of an initiator of the group call.

\* \* \* \* \*